United States Patent Office 2,862,281
Patented Dec. 2, 1958

2,862,281

TREATMENT OF FILAMENTARY MATERIAL

George K. Klausner, Cleveland, Ohio, assignor to Industrial Rayon Corporation, Cleveland, Ohio, a corporation of Delaware No Drawing. Application May 17, 1954
Serial No. 430,429

17 Claims. (Cl. 28—75)

This invention relates to the production of filamentary products having improved adhesion properties when associated with plastic, elastomeric and polymeric materials. More particularly, it relates to a method of making filamentary products in the form of continuous filaments, staple fiber, yarn, thread, cord and the like which may be used in the production of such reinforced products as rubber tires, belts, hose, etc., and coated, impregnated or calendered cloth and the like.

In the production of fiber-reinforced elastomeric and plastic products such as the above, it is necessary to form a strong bond between the elastomer or plastic layer and the reinforcing filamentary structure. To facilitate this bond, some type of bonding agent or adhesive-like material is employed. This is usually applied to an already woven or knitted fabric. If applied to the non-constructed filamentary product, i. e., non-woven or non-knitted yarn or cord such as in the production of tires by the weftless tire-cord fabric system, then the cord is usually treated with an adhesive just prior to the calendering of the layer of rubber. Such techniques avoid the problems and difficulties attending the handling of yarns or cords containing bonding agents. It is probably for these reasons that the operation of applying a bonding agent to the reinforcing yarn, cord or fabric structure is almost always performed by the manufacturer of the reinforced elastomeric or plastic product.

Attempts have been made to perform this adhesive-applying step as part of the customary fiber, yarn or cord processing and manufacturing operations. The object in such cases is to produce a yarn or cord already treated with a bonding agent which could be successfully handled and packaged in the form of cones, beams, etc., and sold to weavers, fabric coaters and tire makers who can then convert the pretreated product directly to fiber-reinforced elastomeric or plastic products without performing a bonding-agent treatment. In the tire art, such treatments are known as cord or fabric "dipping" operations. It has been found, however, that once a bonding agent such as a "dipping" material is applied to filamentary material such as yarn or cord, the further processing or handling thereof is rendered exceedingly difficult. Because of the nature of the bonding or "dip" agent materials heretofore employed the filamentary material may stick together when wound on bobbins, cones, or beams. Moreover, such materials render it exceedingly difficult to wind on, or unwind or twist from, such packages, and in particular, result in poor fabrics when subjected to weaving or knitting operations. Thus, in many cases, abrasive deposits causing filament breaks are formed on the mechanical devices associated with the various yarn handling operations, such as rollers, reels, guides, needles, heddles, etc. When employing continuous methods for the production of yarn and cord, the difficulties encountered are greatly accentuated since the conditions of yarn treatment must be more rigidly controlled than in the corresponding non-continuous operations. Thus, the sticking of treated yarns to each other and the depositing of abrasive-like encrustation materials on the rollers, guides or thread-advancing devices employed results in poor yarn products and in erratic operating procedures.

In accordance with the present invention, the above described difficulties are avoided. This is accomplished by employing certain isocyanate derivatives which are stable at ordinary yarn or cord processing and manufacturing temperatures and do not exhibit at such temperatures any sticky, encrustation-depositing or excessively stiffening properties. Thus, filamentary materials treated therewith can be successfully processed and converted to yarn, cord or fabric. Such isocyanate derivatives, however, when heated to elevated temperatures, sufficient to decompose them to substantially their original components, are rendered chemically active and are thereby permitted to effect permanent and strong bonds with elastomeric or plastic coatings or films. Thus, for example, a viscose rayon yarn may be treated with the particular compounds of the invention at any early stage of its manufacture and thereafter subjected to any of the necessary after-treating operations such as heat-drying, twisting, plying, cabling into tire cord and twist-setting, without any processing difficulties. Then, when the cord containing such treated filamentary material is laminated with rubber and heated above the decomposition temperature of the bonding agent such as in the hot calendering stage or curing stage, the regenerated isocyanate produces an effective bond between the cord and the rubber thereby resulting in improved rubber tires.

In accordance with the present invention, filamentary products having an improved adhesion to plastic, elastomeric or polymeric materials can be made by a process comprising the steps, treating filamentary material in the form of continuous filaments, staple fiber, yarn, thread or cord, with an isocyanate reaction product which decomposes to an isocyanate at a temperature above about 105° C. The temperature of the after-processing of the filamentary material while in said form is maintained below the isocyanate-forming temperature of the isocyanate reaction product.

The filamentary materials that can be treated in accordance with the present invention are the natural, artificial and synthetic fibers such as the cellulosic fibers, e. g., cotton, viscose rayon, cellulose acetate, the polyamides, polyesters, acrylics, or other synthetic organic fibers, and the inorganic fibers such as glass or asbestos fibers.

Among the plastic, elastomeric and polymeric materials suitable for combining with the treated filamentary materials of the present invention are elastomers such as natural and synthetic rubber, polymers such as vinyls, acrylics, polyamides, polyesters, and other plastic or resinous materials such as alkyd type resins, cross-linked polymers and the like.

The filamentary products of the present invention in association with the plastic, elastomeric or polymeric materials may be used in the production of articles such as rubber tires, belts and hose; coated fabrics such as simulated leather goods for use as upholstery material; plastic coated twines and cords; shower curtains, raincoats, fireproof, glass-cloth curtains, and other laminated fabric products.

The filamentary material to be treated with the isocyanate reaction product in accordance with the process of the present invention is in the form of continuous filaments, staple fiber, yarns, thread or cord. As previously indicated, it is with the difficulties arising out of handling fiber in such form, as contrasted to woven or knitted fabrics, that the present invention is concerned. The heat-decomposable, isocyanate reaction product employed in the present process can be characterized generally as a capped, blocked or inhibited isocyanate, i. e., one that is comparatively unreactive as an isocyanate when maintained below the temperature at which it decomposes to form an isocyanate, e. g., below 105° C. Compounds of the type referred to herein as the capped isocyanates are also known as precursors for isocyanates or scission compounds with split or break down to form the original reactants when heated.

The isocyanate reaction products or capped isocyanates which are useful for the purposes of the present invention are generally prepared by reacting isocyanates, which are characteristically quite reactive, with certain other compounds. The isocyanates may be mono or diisocyanates such as ethyl isocyanate, phenyl isocyanate, alpha naphthyl isocyanate, octadecyl isocyanate, 1,6-hexane diisocyanate, m-tolylene diisocyanate, diphenylmethane diisocyanate, etc. The blocking compounds, i. e., those with which the isocyanates are reacted to form the capped derivative thereof, usually contain an active hydrogen such as are found in hydroxyl, carboxylic or aldehydic groups or their corresponding ethers, esters or acetals, and in many cases also active methylene groups. Typical examples of these "blocking" compounds are phenol, diethylmalonate, acetoacetate, acetoacetic anhydride, acetylacetone, hydrogen cyanide, sodium bisulfite, etc. Compounds of the types set forth above are more fully disclosed in the Fiat Review, Preparative Organic Chemistry, part III; O. Bayer, Polyurethans, p. 303.

In choosing the "blocking" compound to be reacted with the isocyanate it is important to select a compound which, when regenerated, does not degrade or otherwise adversely affect the particular filamentary material treated or corrode the processing apparatus employed. Advantageously, a compound may be selected which may have additional beneficial effects upon the ultimate product, for example, the compound may act as an internal lubricant or plasticizer for the yarn or cord or it may impart surface active properties if desired.

In general, compounds of this type have long chain, alkyl groups from 5 to 18 carbon atoms. Examples of some of such reactants are ethyl lauryl malonate and ethyl decyl malonate.

It is also possible to produce an isocyanate reaction product without starting with an isocyanate itself. For example, catechol carbonate can be reacted with a primary amine to produce a precursor or scission compound which decomposes to an isocyanate at a temperature of about 160° C.

Those capped isocyanates should be selected which, as stated above, decompose to isocyanates at temperatures above about 105° C. and preferably above about 110° C. Advantageously, such scission temperatures should be between about 105° C. and 200° C. and with especial advantages between about 110° C. and 175° C. For example, the capped isocyanate formed by the reaction of 1,6-hexane diisocyanate with phenol decomposes to form an isocyanate at a temperature between about 170° C. and 180° C., while the reaction products of 1,6-hexane diisocyanate with diethylmalonate, acetoacetate and acetylacetone decompose at about 135° C., 140° C. and 150° C., respectively.

It is not necessary for the purposes of the present invention that the isocyanate reaction product decompose completely since it may be desirable to have only a part of the reaction product break-down to an isocyanate.

In selecting or preparing a capped isocyanate for a particular operating procedure and for a particular fiber it is necessary that the capped isocyanate have a decomposition temperature above the temperatures which will be encountered in the after-processing steps to be performed on such filamentary material. Thus, for example, where the highest after-processing temperature to be encountered for a given yarn or cord would be that of a steam-drying or a steam twist-setting step at about 100° C., any suitable isocyanate reaction product decomposing above 105° C. could be employed with especial advantage. However, where a hot roll stretching or relaxing step at a temperature of 150° C. is to be performed on a yarn or cord after the treatment with the capped isocyanate, then the capped isocyanate selected must of necessity have a scission temperature above 150° C., e. g., the reaction product of 1,6-hexane diisocyanate with phenol which decomposes at 170°–180° C. The upper limits for the scission temperatures may vary widely depending on the ultimate reinforced elastomeric or plastic article produced, i. e., the scission temperature must be below the calendering, pressing, embossing, vulcanizing or curing temperature employed whichever is the case.

As set forth above, the after-processing of the treated filamentary material may be accomplished according to the process of the present invention without any undue difficulties. The treated filamentary material may be subjected to any of a wide range of after-processing steps, i. e., handling and physical or chemical treating operations. For example, the filamentary material may be subjected to stretching or relaxing operations on heated rolls, or hot-air or steam tubes or heated baths; handling operations such as winding, twisting, creeling, beaming, weaving, knitting, braiding, etc.; drying operations; twist-setting operations with steam or electronic heat; staple fiber operations such as carding, slivering, spinning, drafting, etc.

This invention will be more fully described by the following examples although it is understood that the invention is not limited by these examples.

*Example I*

A wet, freshly spun and processed 1100 denier, 480 filament viscose rayon yarn is treated with the reaction product of 1,6-hexane dissocyanate with diethyl malonate, dispersed in water or dissolved in a suitable volatile solvent, while being temporarily stored on a thread-advancing, thread-storage reel of a continuous rayon spinning and processing machine. The treated yarn is then continuously advanced to a similar thread-advancing reel which is heated internally with steam at about atmospheric pressure thereby drying the yarn. The drier reel is operated continuously without any difficulties caused by sticking of one wrap of yarn to another or to the hot yarn-bearing surface of the reel and also without the accumulation of gummy or horny deposits which would abrade the yarn filaments. The yarn is collected on a bobbin and thereafter twisted, plied and cabled together to form a cord structure all without difficulties. The resulting 2200 denier cord is packaged as a cone and then twist-set with high-frequency electronic heat.

The cord is thereafter unwound from the cone and fed to a circular braiding machine where a braided tube is produced which is suitable for making rubber hose. This operation is performed without any difficulties due to deposits forming on the guides, needles, etc. of the braiding machine. A layer of uncured rubber stock is placed on the inside of the braided fabric tube and another layer on the outside and the combination is cured under heat and pressure at a temperature between about 130° and 180° C., depending upon the intended use of the hose. During the latter operation the scission temperature of the capped isocyanate (135° C.) is exceeded and a permanent bond is effected between the fiber and the rubber by the action of the freed isocyanate. The rayon-reinforced rubber hose thus produced is long lasting and meets the requirements for rugged use.

*Example II*

A 2200 denier viscose rayon cord packaged as a cone, prepared according to the procedure of Example I is unwound from the cone and creeled and thereafter is fed to a duck-fabric weaving machine where a closely woven, heavy duck fabric is produced. This fabric is suitable for use in the production of belting for conveyor belts. No difficulties were encountered due to excessive stiffening of the cord or to deposits forming on the guides, tensioning devices, heddles or other cord-contacting parts of the weaving machine. The resulting duck fabric, without the usual adhesive "dip" treatment, is thereafter calendered directly onto one or more layers of uncured rubber stock and the resulting structure is finally cured under pressure at a temperature between about 130° and 180° C., the latter depending upon the ultimate use of the belting. During the curing operation, an isocyanate is regenerated within the cord thereby effecting a bond between the fiber and the rubber. The belting produced exhibits the desired long-lasting physical properties.

*Example III*

A heavy denier, glass yarn of about 3000 to 4000 denier treated according to Example I with the reaction product of m-tolylene diisocyanate with sodium bisulfite is creeled and the resulting parallel strands are converted into a non-woven web or fabric, without any difficulties due to the accumulation of deposits. To the resulting fabric is calendered in alkyd-type resin at a temperature of about 160° to 200° C. During the hot calendering and curing treatment, the isocyanate in the yarn is regenerated so as to effect a strong bond between the resin and the glass fiber.

Although the foregoing examples have illustrated the application of the invention to viscose rayon and glass yarn structures, it is to be understood that the invention is not intended to be limited thereto. Thus, for example, cords of cotton, nylon or acrylonitrile polymer fibers could be substituted for the rayon in Examples I and II, with similar advantageous results. Likewise, open woven tire cord fabric could be made instead of the closely woven duck fabric of Example II and rubber tires could be constructed therefrom.

I claim:

1. A process for making filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at an elevated temperature; and thereafter maintaining the temperature of the processing thereof while in said form below the isocyanate-forming temperature of said isocyanate reaction product.

2. A process for making filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature above about 105° C.; and thereafter maintaining the temperature of the processing thereof while in said form below the isocyanate-forming temperature of said isocyanate reaction product.

3. A process for making natural, artificial and synthetic filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature above about 105° C.; and thereafter maintaining the temperature of the processing thereof while in said form below the isocyanate-forming temperature of said isocyanate reaction product.

4. A process for making natural, artificial and synthetic filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature above about 110° C.; and thereafter maintaining the temperature of the processing thereof while in said form below the isocyanate-forming temperature of said isocyanate reaction product.

5. A process for making natural, artificial and synthetic filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature between about 105° and 200° C.; and thereafter maintaining the temperature of the processing thereof while in said form below the isocyanate-forming temperature of said isocyanate reaction product.

6. A process for making natural, artificial and synthetic filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature between about 110° and 175° C.; and thereafter maintaining the temperature of the processing thereof while in said form below the isocyanate-forming temperature of said isocyanate reaction product.

7. A process for making natural, artificial and synthetic filamentary products having improved adhesion to plastic, elastomeric or polymeric materials, comprising the steps, treating filamentary material in the form of continuous filaments, staple fiber, yarn, thread or cord, with the reaction product of an isocyanate and a compound selected from the group consisting of phenol, diethyl malonate, acetoacetate, acetoacetic anhydride, acetylacetone, hydrogen cyanide, and sodium bisulfite; said reaction product decomposing to an isocyanate at a temperature above about 105° C.; and thereafter maintaining the temperature of the processing thereof while in said form below the isocyanate-forming temperature of said isocyanate reaction product.

8. A process for making cellulosic filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature above about 105° C.; and thereafter maintaining the temperature of the processing thereof while in said form below the isocyanate-forming temperature of said isocyanate reaction product.

9. A process for making viscose rayon filamentary products having improved adhesion to plastic, elastomeric or polymeric materials, comprising the steps, treating filamentary material in the form of continuous filaments, staple fiber, yarn, thread or cord, with an isocyanate reaction product with decomposes to an isocyanate at a temperature above about 105° C.; and thereafter maintaining the temperature of the processing thereof while in said form below the isocyanate-forming temperature of said isocyanate reaction product.

10. A process for making polyamide filamentary products having improved adhesion to plastic, elastomeric or polymeric materials, comprising the steps, treating filamentary material in the form of continuous filaments, staple fiber, yarn, thread or cord, with an isocyanate reaction product which decomposes to an isocyanate at a temperature above about 105° C.; and thereafter maintaining the temperature of the processing thereof while in said form below the isocyanate-forming temperature of said isocyanate reaction product.

11. A process for making natural, artificial and synthetic filamentary products having improved adhesion to plastic, elastomeric or polymeric materials, comprising the steps, treating filamentary material in the form of continuous filaments, staple fiber, yarn, thread or cord, with the reaction product of an isocyanate and diethyl malonate; said reaction product decomposing to an isocyanate at a temperature above about 105° C.; and thereafter maintaining the temperature of the processing thereof while in said form below the isocyanate-forming temperature of said isocyanate reaction product.

12. A process for making natural, artificial and synthetic filamentary products having improved adhesion to plastic, elastomeric or polymeric materials, comprising the steps, treating filamentary material in the form of continuous filaments, staple fiber, yarn, thread or cord, with the reaction product of an isocyanite and acetoacetate; said reaction product decomposing to an isocyanate at a temperature above about 105° C.; and thereafter maintaining the temperature of the processing thereof while in said form below the isocyanate-forming temperature of said isocyanate reaction product.

13. A process for making natural, artificial and synthetic filamentary products having improved adhesion to plastic, elastomeric or polymeric materials, comprising the steps, treating filamentary material in the form of continuous filaments, staple fiber, yarn, thread or cord, with the reaction product of an isocyanate and acetoacetic anhydride; said reaction product decomposing to an isocyanate at a temperature above about 105° C.; and thereafter maintaining the temperature of the processing thereof while in said form below the isocyanate-forming temperature of said isocyanate reaction product.

14. A process for making natural, artificial and synthetic filamentary products having improved adhesion to plastic, elastomeric or polymeric materials, comprising the steps, treating filamentary material in the form of continuous filaments, staple fiber, yard, thread or cord, with the reaction product of an isocyanate and acetylacetone; said reaction product decomposing to an isocyanate at a temperature above about 105° C.; and thereafter maintaining the temperature of the processing thereof while in said form below the isocyanate-forming temperature of said isocyanate reaction product.

15. A process for making natural, artificial and synthetic filamentary products having improved adhesion to plastic, elastomeric or polymeric materials, comprising the steps, treating filamentary material in the form of continuous filaments, staple fiber, yarn, thread or cord, with the reaction product of an isocyanate and sodium bisulfite; said reaction product decomposing to an isocyanate at a temperature above about 105° C.; and thereafter maintaining the temperature of the processing thereof while in said form below the isocyanate-forming temperature of said isocyanate reaction product.

16. A process for making natural, artificial and synthetic filamentary products having improved adhesion to plastic, elastomeric or polymeric materials, comprising the steps, treating yarn while passing over a thread-storage, thread-advancing device, with an isocyanate reaction product which decomposes to an isocyanate at a temperature above about 105° C.; drying said treated yarn; collecting said dried yarn; twisting the resulting yarn and thereafter packaging said twisted product; the temperature of said processing steps being maintained below the isocyanate-forming temperature of said isocyanate reaction product.

17. A process for making viscose rayon filamentary products having improved adhesion to plastic, elastomeric or polymeric materials, comprising the steps, treating a viscose rayon yarn while being advanced on a thread-storage, thread-advancing reel, with an isocyanate reaction product which decomposes to an isocyanate at a temperature above about 105° C.; drying said treated yarn on an internally heated thread-advancing reel; collecting said dried yarn; twisting the resulting yarn and thereafter packaging said twisted product; the temperature of said processing steps being maintained below about 105° C.

References Cited in the file of this patent

UNITED STATES PATENTS

| | | |
|---|---|---|
| 2,439,514 | Herndon | Apr. 13, 1948 |
| 2,683,729 | Seeger | July 13, 1954 |
| 2,739,918 | Illingworth | Mar. 27, 1956 |

OTHER REFERENCES

"Modern Plastics," Bayer, June 1947, pages 151, 152.